United States Patent Office 2,998,392
Patented Aug. 29, 1961

2,998,392
SOLUTION FOR TESTING FOR POLYMORPHO-
NUCLEAR LEUKOCYTES
Oscar W. Schalm and Daniel O. Noorlander, Davis, Calif., assignors to The Regents of the University of California, Berkeley, Calif.
No Drawing. Filed June 18, 1956, Ser. No. 591,777
2 Claims. (Cl. 252—408)

This invention relates to and in general has for its object the provision of a solution for testing the presence of mastitis.

Mastitis is an inflammation of the mammary glands caused by the infection thereof with various bacteria capable of causing disease and which currently is very common in machine milked commercial dairy herds. The occurrence of pus in milk indicates the presence of mastitis in the mammary glands.

Presently, there are available various methods for testing for mastitis in the field, although for one reason or another none of them is entirely satisfactory.

One such method, for example, involves the use of so-called strip cups provided with 100-mesh screen false bottoms and through which milk is drawn for the detection of visible particles. However, to be effective as a means for detecting chronically irritated mammary glands, this test must be used daily, for in chronic mastitis the milk is not visibly abnormal at all times. The milk from a given gland may show positive on one strip cup examination at one milking but not on the next. Furthermore, a single use of the strip cup method seldom detects more than 10 to 20 percent of the chronically inflamed glands.

Another field test sometimes resorted to involves the use of blotting paper impregnated with bromthymol blue for detecting abnormal acidity or alkalinity in the milk. This test at best does not detect more than 30 to 40 percent of the chronically inflamed glands, and when the inflammation has become of sufficient magnitude to alter the pH of the milk or its physical appearance, usually considerable damage to the mammary tissues has already occurred.

More specifically, the object of this invention includes agitating a sample of milk from any desired quarter of a cow with about an equal quantity of an aqueous solution of an anionic surface active agent containing a trace of a contrasting dye and observing the mixture for the occurrence of thickening and leading to an actual gel formation in very positive samples.

The following reagents are illustrative of the anionic surface active agent suitable for this purpose: a sodium or potassium salt of a fatty acid, a sodium or potassium alkyl aryl sulfonate, a sodium or potassium alkyl sulfonate, a sodium or potassium alkyl aryl sulfate, or a sodium or potassium alkyl sulfate. More specifically, we have found that an aqueous solution (distilled water) of from 2½ percent to 3 percent of an anionic surface active agent containing a dye such as bromcresol purple or bromthymol blue in a final concentration of $1/10,000$ to $1/20,000$ and having a substantially neutral pH serves as a suitable mastitis testing agent, particularly when it is applied to a sample of milk contained in a cup having a while opaque bottom. Here it should be observed that the proportions or concentrations above set forth are not critical in that an excess of the anionic surface active agent in the order of 5 percent does not interfere with the test, and as little as 1.5 percent of the agent gives a reaction with positive milk, although of a somewhat lesser intensity.

It should also be here observed that many soaps and synthetic detergents are primarily anionic surface active agents and therefore can be effectively used as a mastitis test solution along with a small amount of a suitable dye for rendering more visible the reaction thereof with milk being tested and thus making it possible to grade such reaction. This type of solution is suitable not only for testing for mastitis but also for determining the alkalinity of the milk.

Conveniently, our method can be carried out by the use of four shallow plastic cups having a common white opaque base and upstanding therefrom, the cups being arranged in a square pattern so that milk from each quarter of a cow can be selectively delivered to each of the four cups. After milk has been so drawn into these cups they can be simultaneously tilted sufficiently to spill therefrom a little of their milk content, thereby to leave in the four cups about equal quantities of milk. This having been done, about an equal quantity of the testing solution above described may be added to each cup conveniently from a flexible plastic dispensing container. Since the quantity of milk remaining in each cup is just about sufficient to cover its bottom, the quantity of testing solution to be added to each cup can be readily gauged with a sufficient degree of accuracy for the purposes of the test without requiring the use of droppers or other metering equipment.

If an abnormal count of polymorphonuclear leukocyte cells is present in the milk it will thicken almost immediately upon agitation of the mixture; the degree of thickening parallels the PMN leukocyte count. A slight thickening, which tends to disappear as agitation of the sample is continued, is called a TRACE reaction; a thickening without gel formation is a one plus reaction; when the mixture thickens and tends to gel and exhibits a tendency to be drawn toward the center of the cup as it is moved in a circular fashion, the reaction is called two plus; and, finally, milk that forms a gel or very viscous mass which tends to adhere to the bottom of the cup and to have a convex or bulging upper surface, is classified as three plus reaction.

Although the bases of the testing cups have been referred to as opaque, some light can pass through them to partially illuminate the film of milk contained therein, this being of importance when milking is done in a relatively dark barn.

As above indicated, the dye used should be of a color contrasting with the color of the milk and with the base of the cups. The dye in the test solution aids in ascertaining when the proper amount of test solution has been added to the milk, for as soon as the white color of the milk has disappeared, sufficient test solution has been added. Also, it is to be noted that the dye used is a pH indicator, and that since the test solution has a neutral pH, upon the addition thereof to the milk, the color of the solution will change if the milk be either on the acid or the alkaline side.

Although the use of the cups above described is convenient in making our test for the reason that it is easy to bring them to a uniform milk content, to identify them relative to the four quarters of a cow, and to readily observe what takes place when the test solution is added thereto, test tubes or other receptacles may of course be used.

To gain a better understanding of the significance of the positive reaction of milk to our solution, consideration should be given to the following information.

The body cells in normal milk are mainly mononuclear types of epithelial origin. Any significant occurrence of true polymorphonuclear leukocytes is an indication of an abnormal condition.

The number of cells in milk is subject to wide variation under physiologic conditions. In colostrum, cell fragments or cells laden with fat, the so-called colostrum corpuscles are of common occurrence, whereas in the drying-off secretions a high cell count due to sloughing of epithelial cells is to be anticipated.

The cells in milk are expressed in number/cc. of milk. Among 690 normal milks from individual mammary quarters, collected from the second week through the seventh month of lactation, the following percentage distribution in total cell counts were recorded.

| Number of cells/cc. milk | Percentage of total milks |
|---|---|
| 0–100,000 | 76.52 ⎫ |
| 100,001–250,000 | 13.76 ⎬ 96.51 |
| 250,001–500,000 | 6.23 ⎭ |
| 500,001–1,000,000 | 2.31 |
| Over 1,000,000 | 1.15 |
| | 99.97 |

Differential cell counts on normal milk showed that 81.6 percent of the milks had less than 25 percent of the cells of polymorphonuclear (PMN) type and in 93 percent of the milks, the PMN type cell contributed less than 50 percent of the total cells. Of all normal milks studied, 96.5 percent had total cell counts not exceeding 500,000 cells per cc. of milk.

Cell counts have been made on several hundred milks that have been tested using our test solution. Data thus far obtained are as follows:

tion but that other products of inflammation are probably also involved. Cell counts are highest in fore-milk, strippings and colostrum, whereas when mixed udder milk is used dilution occurs so that the counts are somewhat lower at the point where a definite reaction develops. However, mean total cells per cc. of milk in every instance, even in the mixed udder milk, exceed 500,000 cells which was the upper limit of the cell count in 96.5 percent of 690 known normal milks. Furthermore, these data reveal that the ratio of PMN leukocytes to mononuclear cells in normal milks is about 1 to 2, whereas with milks positive to our mastitis test the ratio is approximately 1 to 1 with one plus reactions, 1 to 0.6 with milks giving a 2 plus reaction, and 1 to 0.4 with milks giving a three plus reaction. This means that our mastitis test reflects the occurrence of PMN leukocytes in above normal numbers in milk, and therefore it is a rapid, inexpensive procedure for the detection of abnormal milk.

The counting of cells in milk is laborious and therefore impractical for routine diagnosis of mastitis on a herd-wide basis. However, it is the most critical of the tests on milk for the detection of the existence of inflammation in the mammary gland. For example, Little (Bovine Mastitis. III. A comparison of the bacteriological and physiological reactions of normal and mastitic milk from young cows. Cornell Veterinarian, vol. 28,

| Type of milk | | negative | trace | one plus | two plus | three plus |
|---|---|---|---|---|---|---|
| Fore-milk (200 samples) SSH herd | PMN | 10,000 | 200,000 | 600,000 | 2,130,000 | 3,730,000 |
| | MONO | 38,000 | 400,000 | 660,000 | 1,370,000 | 1,660,000 |
| | ratio [1] | 1 to 3.8 | 1 to 2 | 1 to 1.1 | 1 to 0.64 | 1 to 0.47 |
| Mixed udder milk (113 samples) SQ herd | PMN | 48,000 | 110,000 | 330,000 | 1,320,000 | 6,000,000 |
| | MONO | 91,000 | 200,000 | 360,000 | 650,000 | 2,500,000 |
| | ratio [1] | 1 to 1.9 | 1 to 1.8 | 1 to 1.1 | 1 to 0.5 | 1 to 0.4 |
| Mixed udder milk with preservative (boric acid) 97 samples. | PMN | 86,000 | 180,000 | 480,000 | 1,550,000 | [2] |
| | MONO | 200,000 | 240,000 | 420,000 | 750,000 | |
| | ratio [1] | 1 to 2.3 | 1 to 1.3 | 1 to 0.87 | 1 to 0.48 | |
| Mixed udder milk (53 samples) UCF herd | PMN | 86,000 | 65,000 | 550,000 | 1,920,000 | 3,600,000 |
| | MONO | 130,000 | 170,000 | 500,000 | 1,240,00 | 1,410,000 |
| | ratio [1] | 1 to 1.5 | 1 to 2.6 | 1 to .9 | 1 to .64 | 1 to .4 |
| Colostrum (25 samples) SSH herd | PMN | 260,000 | [2] | 800,000 | 2,000,000 | 6,100,000 |
| | MONO | 380,000 | | 500,000 | 1,170,000 | 2,500,000 |
| | ratio [1] | 1 to 1.46 | | 1 to 0.62 | 1 to 0.58 | 1 to 0.4 |
| Strippings (29 samples) SSH herd | PMN | [2] | 390,000 | 900,000 | 5,170,000 | [2] |
| | MONO | | 660,000 | 750,000 | 1,520,000 | |
| | ratio [1] | | 1 to 1.7 | 1 to 0.83 | 1 to 0.29 | |

[1] PMN type cell=1.
[2] No samples.

The data presented above are in terms of the mean cell count of PMN leukocytes (pus cells) and mononuclear cells (essentially epithelial of cells of mammary gland origin) for each of the five classifications of reactions occurring with milk when milk and our Mastitis Test Solution are mixed in equal parts. Fore-milk is the first streams of milk taken from the gland before a regular milking period; strippings represent milk remaining in the gland at the completion of regular milking; mixed udder milk is a sample taken from the bucket and represents the mixed milk from the entire udder obtained at a single milking; mixed milk with the preservative boric acid is milk that is 12 to 36 hours old and that has been collected by a cow sampler in Dairy Herd Improvement work in Sacramento County, California; and, colostrum is material collected from the udder on the day of calving.

With each type of milk, the mean cell level at which a one plus reaction begins is different. This suggests that PMN leukocytes are not solely responsible for the reac- 1938, 23) compared pH, chlorides, and leukocyte number of normal milk with milk from quarters known to be infected with pathogenic streptococci. The following results were reported:

| | Normal milk, percent | Streptococcus-infected milk, percent |
|---|---|---|
| pH of fore-milk over 6.7 | 0.7 | 18.6 |
| Chlorides over 0.15 grams percent | 0.5 | 23.0 |
| Cell count (total cells): | | |
| 0–100,000 cells/cc. milk | 87.0 | 2.3 |
| over 500,000 cells/cc. milk | 4.0 | 90.0 |

Murphy (The general effect of staphylococcal infection on the biochemical composition of strict foremilk. Cornell Veterinarian volume 33, 1943, 52) compared the leukocyte, chloride content, and pH of fore-milk coming from glands which he classified as uninfected, staphylococcus-infected and streptococcus-infected:

| Infection classification | Number of samples | Percent of samples showing— | | |
|---|---|---|---|---|
| | | Leukocytes, 500,000 or more/cc. milk | Chlorides, 0.16% or more | pH, 6.9 or higher |
| Uninfected | 2,314 | 1.9 | 5.7 | 3.2 |
| Staphylococcus-infected | 1,154 | 49.3 | 23.1 | 9.5 |
| Streptococcus-infected | 581 | 77.8 | 41.3 | 20.2 |

The data assembled by Murphy clearly show that streptococci more commonly cause alterations in the milk than micrococci. This has been the experience of all observers who have compared the two types of infections and this difference was described as early as 1918 by Jones (Studies in Bovine Mastitis. I. Non-hemolytic streptococci inflammation of the udder. Journal Experimental Medicine volume 28, 1918, 149).

Adler and Migaki (Cell types in milk of cows in a chronic staphlococcal mastitis herd. Veterinary Medicine volume 46, 1951, 89) in a study of cell types in milk of cows in a chronic staphylococcal mastitis herd concluded: "In Staphylococcus pyogenes infection there is a marked increase in PMN leukocytes; this increase is apparent even though the condition has not yet advanced to a clinical state and is a more sensitive indicator of the mastitic condition than either a total cell or bacterial count."

These literature references which are representative of the many reports that have appeared clearly indicate that when bacterial infections of the udder reach the point where irritation or inflammation is produced, the cell count and especially the PMN leukocyte number rises. Any factor that will produce irritation in the bovine mammary gland, whether bacterial or physical (forceful striking of the udder or allowing milking machine vacuum to injure the udder) will elicit an inflammatory response in the tissues and the PMN leukocytes will enter the milk in numbers in direct proportion to the extent of the irritation.

Our test, therefore, is not a test for a specific type of udder irritation but rather a rapid procedure for the detection of milks having abnormally high PMN leukocyte counts. It is a screening method for the detection of cows having irritated udders, and it provides a means for demonstrating in a visual manner the incidence and degree of udder irritations in a herd. Reacting udders should be tested further by bacteriologic methods to determine whether the irritation is of bacterial origin and for type of bacteria so that specific drugs and/or antibiotics may be selected by the veterinarian for treatment. In the event that no pathogenic bacteria are found in glands producing positive milk, it may be interpreted that the irritation is the result of factors other than infection with the common mastitis bacteria, and proper steps other than therapy must be taken to overcome the inciting cause of the irritation.

We claim:
1. A solution for testing for polymorphonuclear leukocytes consisting essentially of: a pH neutral, 1.5 to 5% aqueous solution of an anionic surface active agent and a pH indicator in an amount sufficient to change in color in response to a change in the pH of the solution and having a neutral equilibrium constant.

2. A solution for testing for polymorphonuclear leukocytes consisting essentially of: a pH neutral, 1.5 to 5% aqueous solution of an anionic surface active agent selected from the group consisting of the sodium alkyl aryl sulfonates, potassium alkyl aryl sulfonates, sodium alkyl sulfates, potassium alkyl sulfates; and a pH indicator in an amount sufficient to change in color in response to a change in the pH of the solution and having a neutral equilibrium constant.

References Cited in the file of this patent
UNITED STATES PATENTS

| | | |
|---|---|---|
| 1,803,076 | Simone | Apr. 28, 1931 |
| 2,194,131 | Terry | Mar. 19, 1940 |
| 2,498,344 | Rider et al. | Feb. 21, 1950 |
| 2,502,881 | Parker | Apr. 4, 1950 |
| 2,643,230 | Mooradian | June 23, 1953 |
| 2,659,700 | Carson | Nov. 17, 1953 |
| 2,709,670 | Ichelson | May 31, 1955 |

OTHER REFERENCES

Martin: The Modern Soap and Detergent Industry, vol. 2, Crosby Lockwood and Son, London 1931, page 16, Sec. IX.

Effect of Surface Active Agents on Bacteria, article from Annals of New York Academy of Sciences, vol. 46, Mar. 15, 1946, page 470 and 462–473.

Practical Physiological Chemistry, Hawk, Oser, and Summerson, chapter 22, pages 475–476 (1954), McGraw-Hill Book Co., N.Y.